United States Patent [19]

Ahmed

[11] Patent Number: 5,208,682
[45] Date of Patent: May 4, 1993

[54] METHOD AND APPARATUS FOR AN AUTO HANDSHAKE CAPABLE FACSIMILE MACHINE USING DIGITAL SYNC FAX PROTOCOLS

[75] Inventor: Allam Z. Ahmed, Santa Clara, Calif.

[73] Assignees: Ricoh Company Ltd., Tokyo, Japan; Ricoh Corporation, San Jose, Calif.

[21] Appl. No.: 872,920

[22] Filed: Apr. 23, 1992

[51] Int. Cl.$^5$ ............................................. H04M 1/00
[52] U.S. Cl. ..................................... 358/434; 358/437
[58] Field of Search ................................ 358/434–439, 358/407, 411, 442

[56] References Cited

U.S. PATENT DOCUMENTS

| | | | |
|---|---|---|---|
| 3,920,895 | 11/1975 | Vieri et al. | 358/407 |
| 4,719,514 | 1/1988 | Kurahayashi et al. | 358/439 |
| 5,001,571 | 3/1991 | Murano | 358/434 |
| 5,014,300 | 5/1991 | Harvath | 358/407 |
| 5,021,890 | 6/1991 | Yoshida et al. | 358/437 |
| 5,050,005 | 9/1991 | Kagami | 358/434 |
| 5,055,945 | 10/1991 | Oguma et al. | 358/437 |

OTHER PUBLICATIONS

"Fax: Digital Facsimile Technology and Applications" Kenneth R. McConnell et al., Artech House, 1989, pp. 40–51.

*Primary Examiner*—Stephen Brinich
*Attorney, Agent, or Firm*—Flehr, Hohbach, Test, Albritton & Herbert

[57] ABSTRACT

A facsimile machine is provided which includes a mechanism to detect from the received message the operation mode of a transmitting facsimile. The mechanism automatically sets and re-sets the facsimile machine in an operation mode corresponding to the operation mode detected.

21 Claims, 13 Drawing Sheets

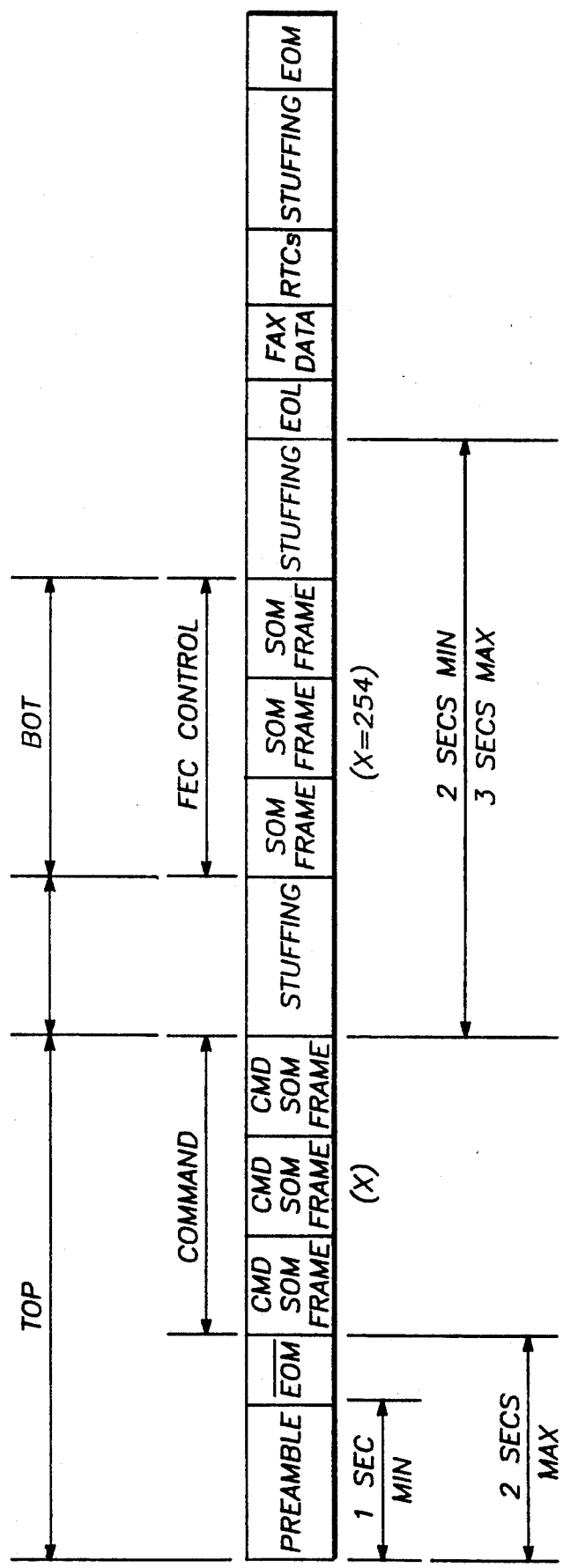
FIG.—3A

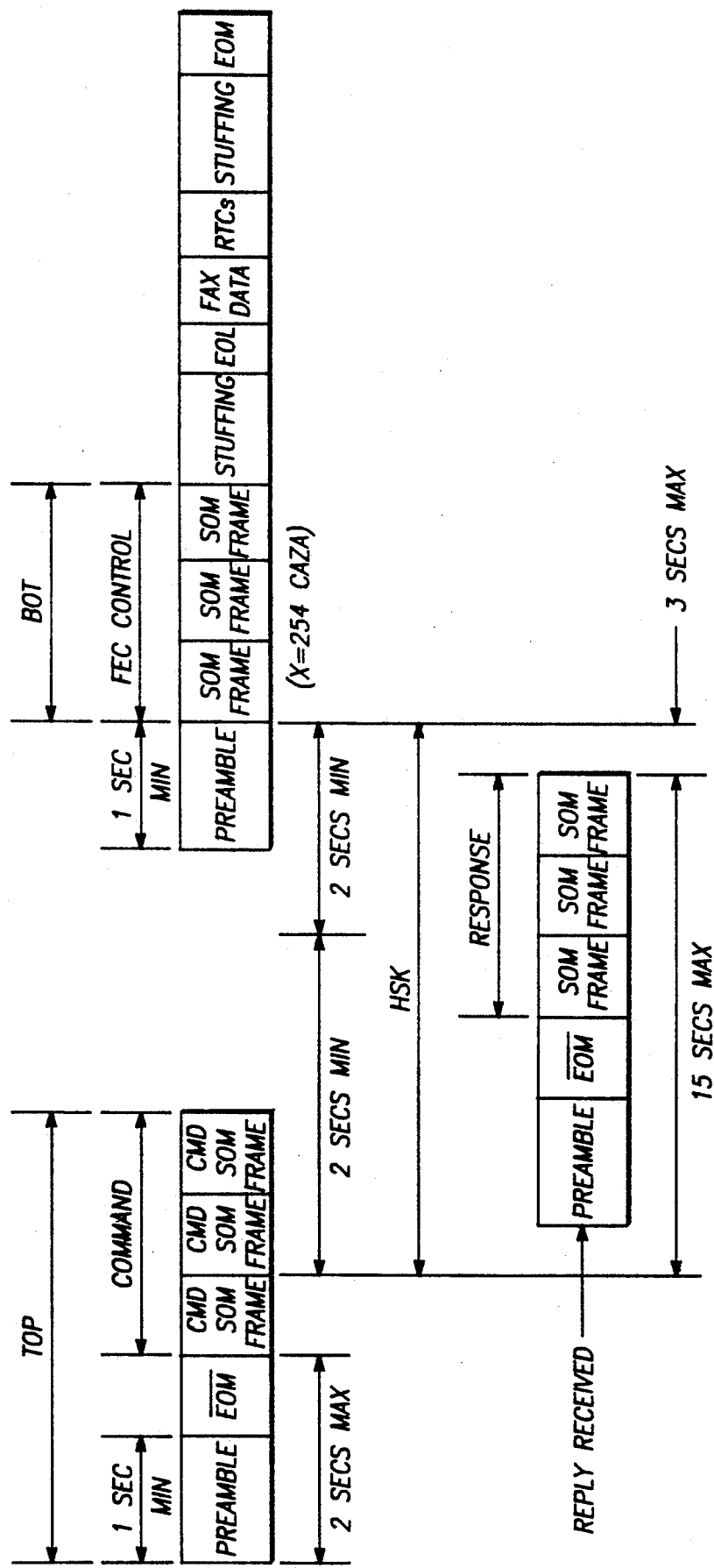
FIG.—4A

TABLE I

| NAME | MAKE UP |
|---|---|
| BEGINNING OF INTERMEDIATE LINE PAIR (BLIP) | 00000000000000011 |
| BEGINNING OF LINE PAIR (BLOP) | 00000000000000010 |
| END OF LINE (EOL) | 000000000001 |
| END OF MESSAGE (~EOM) | 16 CONSECUTIVE S1 CODE WORDS |
| RETURN TO CONTROL (RTC) | EOL EOL EOL EOL EOL EOL |
| START OF MESSAGE (SOM) | S1S0 X CLOCK PERIODS S0S1 (WHERE X IS THE NUMBER OF CLOCK PERIODS BETWEEN THE PAIRS OF CODE WORDS) |
| S0 | 111100010011010 |
| S1 | 111101011001000 |
| FILL | VARIABLE LENGTH STRING OF 0s |
| STUFFING | VARIABLE LENGTH STRING OF 1s |
| PREAMBLE | VARIABLE LENGTH STRING OF ALL 1s OR ALL 0s |

TABLE II

| PROTOCOL ELEMENT | COMPOSITION | TRANSMISSIONS REQUIRED | DETECTIONS REQUIRED |
|---|---|---|---|
| SOM | S1S0XS0S1 | 3 | 1 |
| EOM | S1 | 16 MINIMUM | 4 IN SEQUENCE |

METHOD AND APPARATUS FOR AN AUTO HANDSHAKE CAPABLE FACSIMILE MACHINE USING DIGITAL SYNC FAX PROTOCOLS

BACKGROUND OF THE INVENTION

This invention relates generally to facsimile machines and, more particularly to a facsimile machine adaptable to digital synchronization FAX protocols, including the MIL-STD-188-161 B&C standard.

Facsimile machines are used to transmit and receive image data over a communication link in accordance with pre-determined protocols that can include two operation modes: (1) a non-handshake mode, and (2) a handshake mode. The MIL-STD-188-161 B&C standard defines such two operation modes.

Handshaking refers to a bilateral information exchange between a transmitting facsimile machine and a receiving machine, that can facilitate data transmission. In non-handshake mode, no such handshake information is required for a facsimile machine at the transmitting end of the communication link to send FAX or image data to a facsimile machine at the receiving end of the communication link. By contrast, in handshake mode to initiate image data transmission from the transmitting facsimile machine, such handshake information is required between facsimile machines at the transmitting end and at the receiving end.

Traditionally, being adaptable to a pre-determined protocol that includes both non-handshake and handshake modes, the facsimile machines at the transmitting end and at the receiving end both have to be set in the same mode (either both in a mode for non-handshake operation or in a mode for handshake operation). This is so because in non-handshake mode (or broadcast mode) the transmitting end blindly transmits image data and assumes that the receiving end is ready and can comprehend the image data. In handshake mode, however, the transmitting end first sends a beginning protocol; in response to which, the receiving end has to send a response indicating its readiness and capability to accept the image data. Thus, in handshake mode, the transmitting end has to wait and verify this response before transmitting image data.

Under certain applications, a protocol that includes the both operation modes is required. For example, the MIL-STD-188-161 B&C standard is mandatory within the Department of Defense in the design, development and acquisition of facsimile equipment. (For detailed information of the MIL-STD-188-161 B&C standard, see the MIL-STD-188-161 B&C specification entitled "Interoperability and Performance Standards for Digital Facsimile Equipment" published by the Department of Defense, Washington, D.C.)

Conventionally, if the two facsimiles at the transmitting end and the receiving end are set in different modes, the image data may not be correctly transmitted. For example, assume that the facsimile machine at the transmitting end is set in handshake mode, and the facsimile machine at the receiving end is set in non-handshake mode. After transmitting the beginning protocol to the facsimile machine at the receiving end, the facsimile machine at the transmitting end awaits a confirmatory response from facsimile machine at the receiving end. But if the facsimile machine at the receiving end is set in non-handshake mode, it will never issue the response. As a result, the facsimile machine at the transmitting end cannot start image data transmission.

Clearly then the restriction that the facsimile machines at the transmitting end and the receiving end must be set in the same operation mode can be disadvantageous. To ensure an ability to receive image data transmitted in either non-handshake or handshake mode without interferences, the receiving end should have two facsimile machines with one being set in non-handshake mode and the other being set in handshake mode. Alternatively, using one facsimile machine to receive image data transmitted in either operation mode would require the receiving end to manually re-set its facsimile machine according to the operation mode changes at the transmitting end.

Thus, there has been a need for a facsimile machine whose operation mode can be automatically set and re-set to match the operation mode at the transmitting end. Such facsimile machine should also adapt to existing protocols, including the MIL-STD-188-161 B&C standard. This invention provides such a facsimile machine and a method to meet this need.

SUMMARY OF THE INVENTION

In one aspect, this invention provides a novel facsimile machine that can adapt to a protocol standard for transmitting and receiving image data. The standard typically defines a first operation mode and a second operation mode. This invention identifies the protocol standard signal timings into a first protocol type, a second protocol type and a response protocol type.

According to this invention, the facsimile machine includes a mechanism that detects the operation mode of a transmitting facsimile machine, and sets and re-sets the facsimile machine in a corresponding operation mode according to the detected operation mode of the transmitting facsimile machine.

The mechanism includes means for detecting the first protocol type, means for detecting the second protocol type, and means for setting the facsimile in the first operation mode and the second operation mode in response to detections of the protocol type and the second protocol type.

The mechanism further includes means for generating the response protocol type in response to the first and the second operation mode set by the setting means.

In another aspect, this invention provides a novel method for automatically setting and re-setting the facsimile machine in an operation mode corresponding to the detected operation mode of the transmitting facsimile machine. The method includes the steps of detecting the first protocol type, detecting the second protocol type, and setting the facsimile machine in the first operation mode and the second operation mode in response to detections of the first protocol type and the second protocol type.

The method further includes step of generating the response protocol type in response to the first operation mode and the second operation mode set by the setting step.

By setting the facsimile machine according to the detections of the first protocol and second protocol types, the operation mode of the facsimile machine can be automatically set and re-set during the image data transmission operations.

These and other features and advantages of this invention will become more apparent from the following description of preferred embodiment, as illustrated in the accompanying drawings.

BRIEF DESCRIPTION OF THE DRAWINGS

The purpose and advantages of this invention will be apparent to those skilled in the art from the following detailed description in conjunction with the appended drawings in which:

FIG. 3A illustrates signal timing in the non-handshake mode for transmitting compressed image data without Forward Error Correction (FEC).

FIG. 4A illustrates signal timing in the handshake mode for transmitting compressed image data with out FEC.

FIG. 5 illustrates TABLEs I-II showing digital signal formats.

DETAILED DESCRIPTION OF PREFERRED EMBODIMENT

This invention comprises a novel facsimile machine and an associated method. The following description is presented to enable any person skilled in the art to make and use the invention, and is provided in the context of a particular application and its requirements. Various modifications to the preferred embodiment will be readily apparent to those skilled in the art, and the generic principles defined herein may be applied to other embodiments and applications without departing from the spirit and scope of the invention. Thus, the invention is not intended to be limited to the embodiment shown, but is to be accorded the widest scope consistent with the principles and features disclosed herein.

To differentiate non-handshake mode from handshake mode, the invention analyzes the MIL-STD-188-161 B&C standard signal timing patterns, and identifies a top (TOP) protocol and a bottom (BOT) protocol therein. It must be emphasized that the TOP and BOT protocols are applicant's own identifications to facilitate implementation of the invention.

Figure 1:
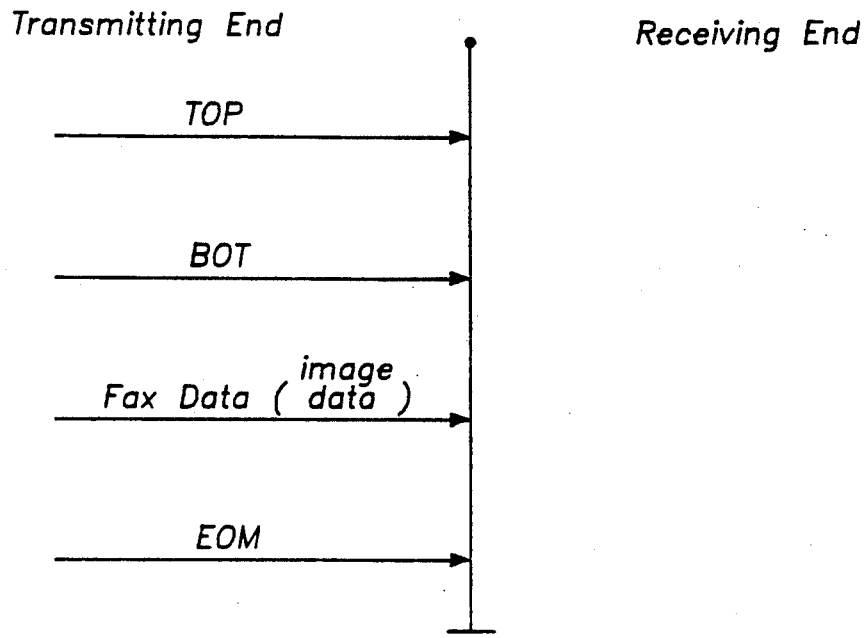
FIG. 1 illustrates an image data transmission process in the non-handshake mode, in accordance with the MIL-STD-188-161 B&C standard.

Referring to FIG. 1, there is shown an image data transmission process of non-handshake mode operation, in accordance with the MIL-STD-188-161 B&C standard. In the non-handshake mode operation, the facsimile machine at the transmitting end first sends a TOP protocol, and then sends a BOT protocol to the facsimile machine at the receiving end. After the BOT protocol is sent, the facsimile machine at the transmitting end sends image data to the facsimile machine at the receiving end. At the end of the image data, the facsimile machine at the transmitting end sends an end of message (EOM) frame to indicate that the data transmission process has been completed.

Figure 2:
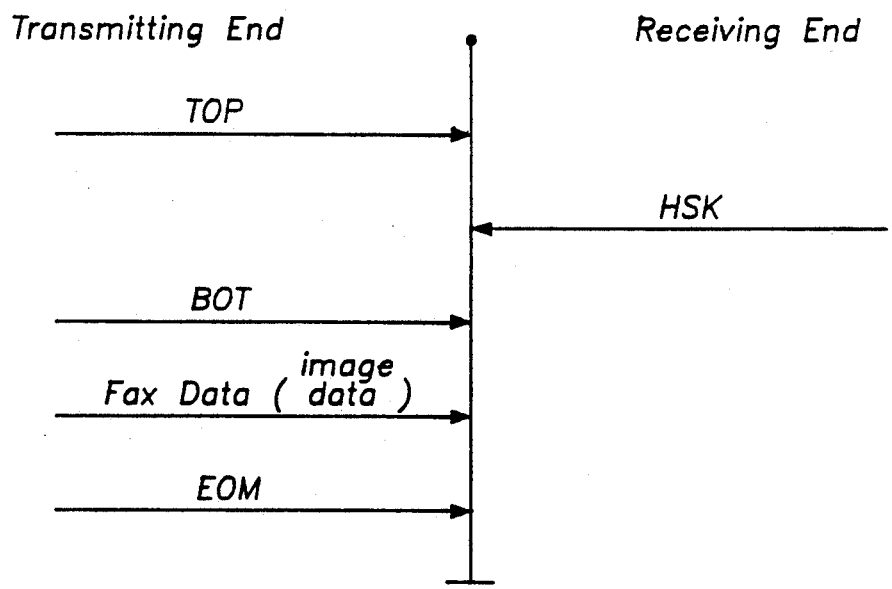
FIG. 2 illustrates an image data transmission process in the handshake mode, in accordance with the MIL-STD-188-161 B&C standard.

Referring now to FIG. 2, there is shown an image data transmission process of handshake mode operation, in accordance with the MIL-STD-188-161 B&C standard. In the handshake mode operation, the facsimile machine at the transmitting end first sends a TOP protocol, and awaits a response from the facsimile machine at the receiving end. Upon receiving the TOP protocol, the facsimile machine at the receiving end sends a handshake (HSK) protocol to the facsimile machine at the transmitting end. Upon receiving the HSK protocol, the facsimile machine at the transmitting end then sends a BOT protocol to the facsimile machine at the receiving end. After the BOT protocol is sent out, the facsimile at the transmitting end sends image data. At the end of the image data, the facsimile machine at the transmitting end sends an EOM frame to indicate that the data transmission process has been completed.

The MIL-STD-188-161 B&C standard defines three image data types, including: (1) compressed data with Forward Error Correction (FEC), (2) compressed data without FEC, and (3) uncompressed data. In the MIL-STD-188-161 B&C standard, the BOT protocol has different formats in accordance with the three image data types.

Figure 3B:
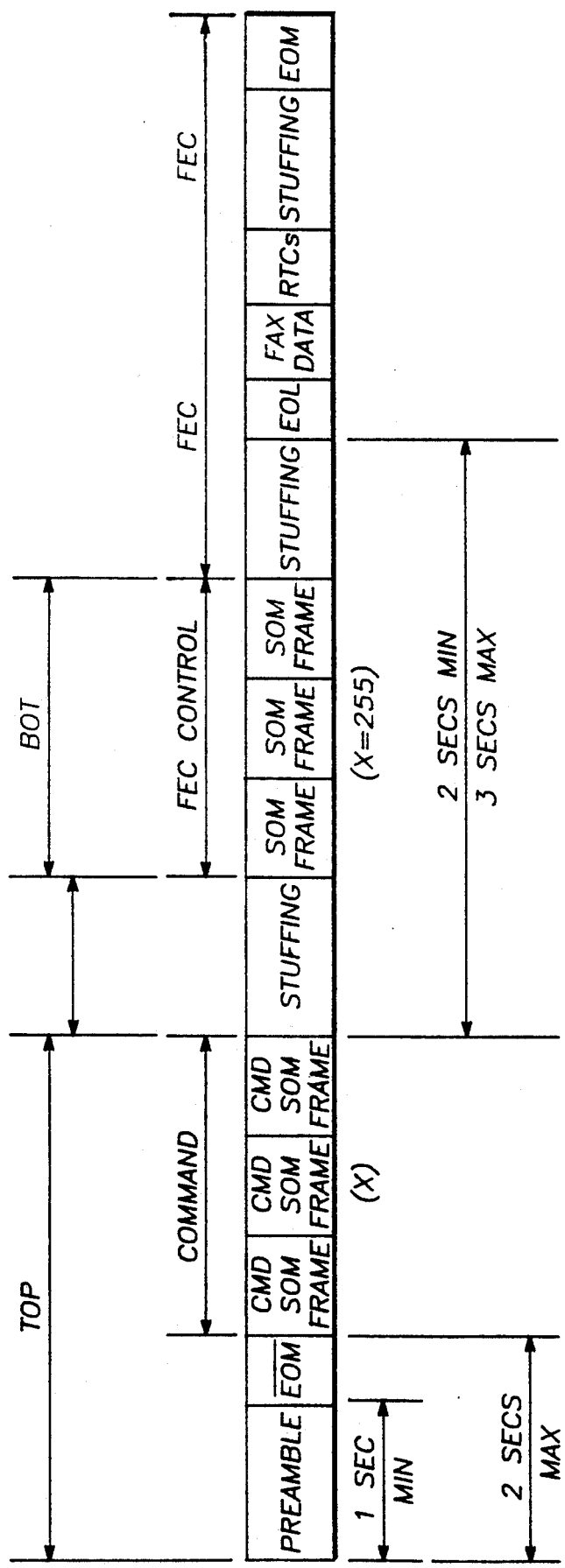
FIG. 3B illustrates signal timing in the non-handshake mode for transmitting compressed image data with FEC.
Figure 3C:
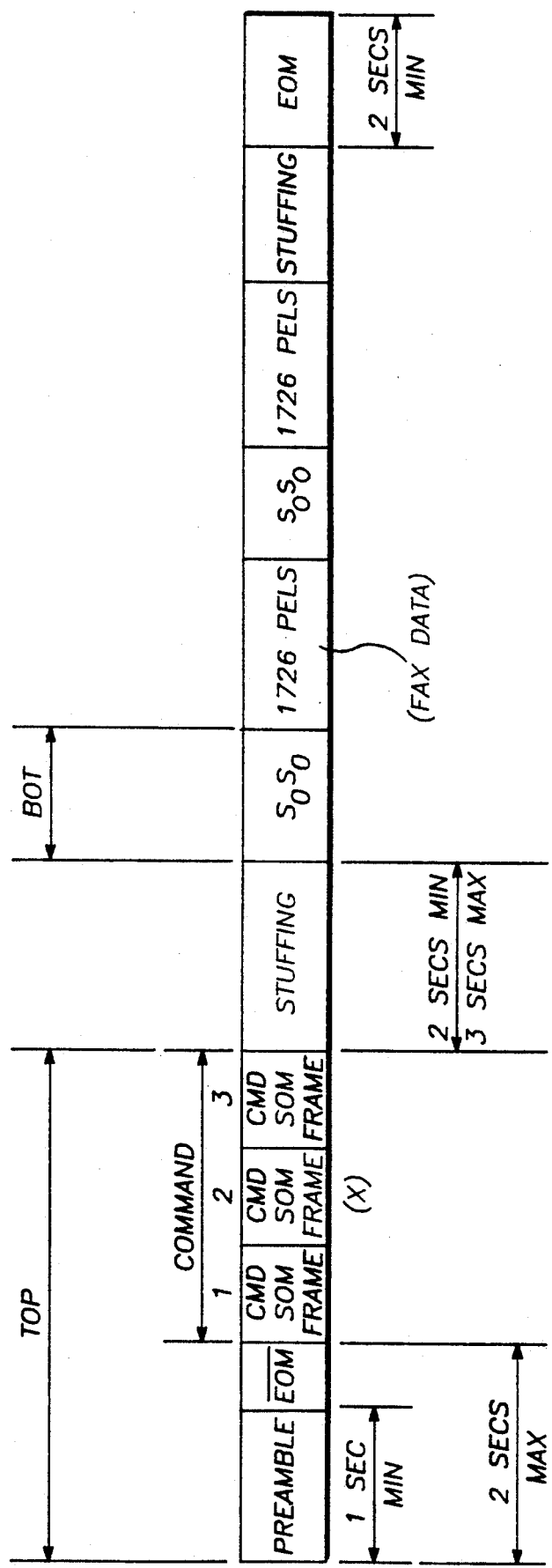
FIG. 3C illustrates signal timing in the handshake mode for transmitting uncompressed image data.
Figure 4B:
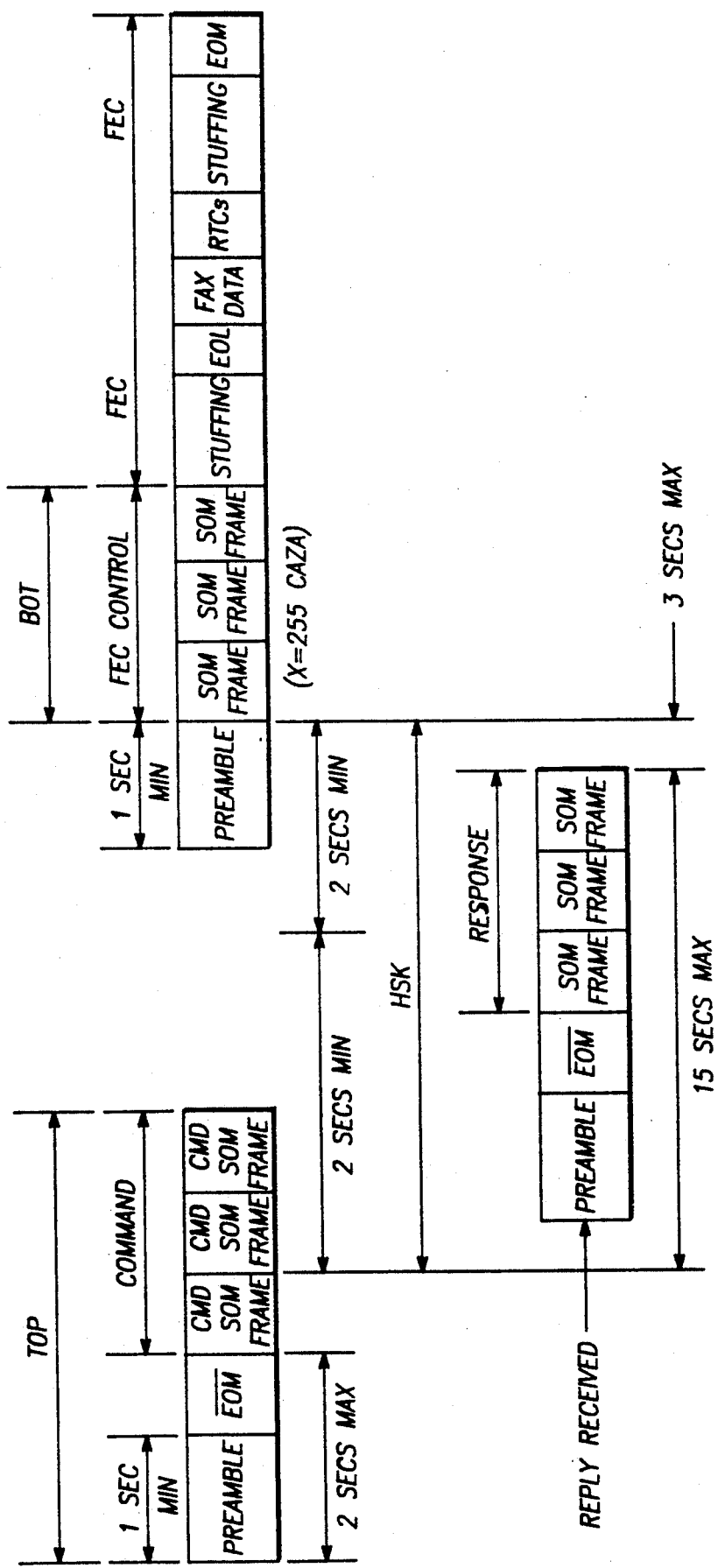
FIG. 4B illustrates signal timing in the handshake mode for transmitting compressed data with FEC.
Figure 4C:
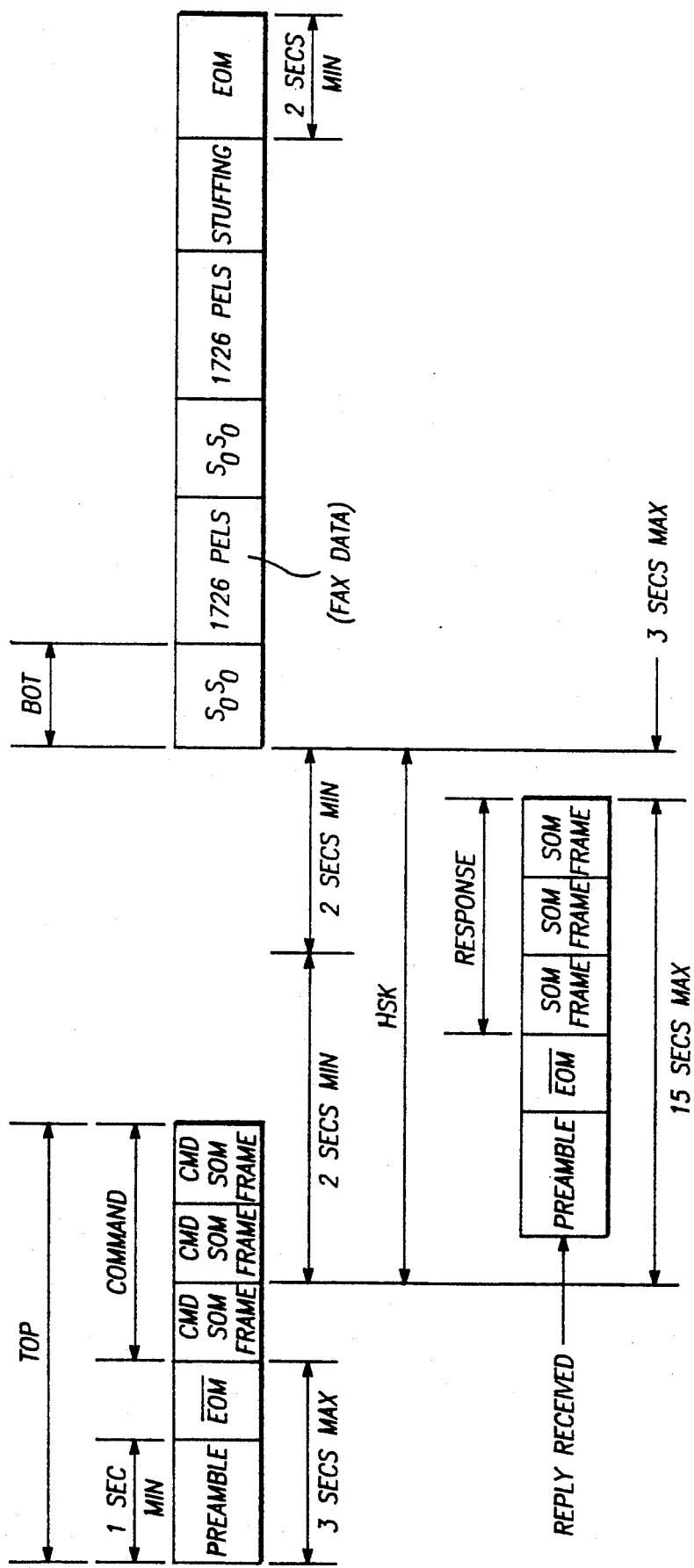
FIG. 4C illustrates signal timing in the handshake mode for transmitting uncompressed image data.

Referring now to FIGS. 3A-3C, there are shown three signal timing formats corresponding to the three image data types in non-handshake mode operation respectively. Referring to FIGS. 4A-4C, there are shown three signal timing formats corresponding to the three image data types in handshake mode operation respectively.

In FIGS. 3A-3C and 4A-4C, each signal timing includes a plurality of sections (represented by rectangular boxes), and each section includes one or more frames. The names associated with the sections are standardized terms in the art, and thus these sections will not be described in detail herein.

Referring to FIG. 5, there are shown Table I and Table II illustrating specific signal formats for each of the sections depicted in FIGS. 3A-3C and 4A-4C. For example, Table I shows that the EOM frame has a format of 16 consecutive $S_1$ code words, where the $S_1$ code word has a format of 111100010011010. The corresponding relationships between FIGS. 3A-3C, 4A-4C and FIG. 5 are self-explanatory to those skilled in the art. Thus, they will not be explained in detail herein.

To better appreciate this invention, it is very useful to illustrate operational steps for conventional facsimile machines.

Figure 6:
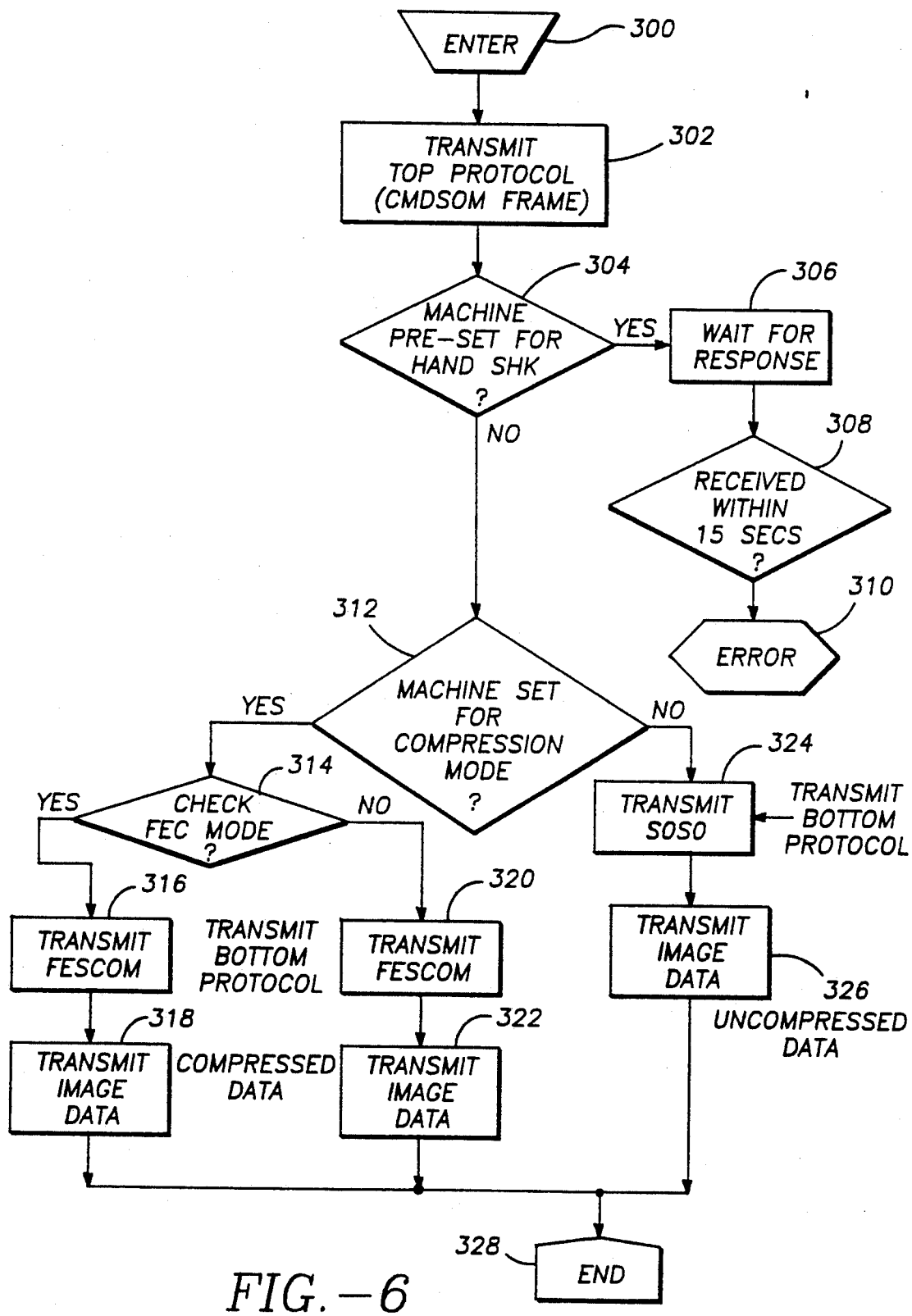
FIG. 6 illustrates operational steps for a conventional facsimile machine at the transmitting end, in accordance with the MIL-STD-188-161 B&C standard.

Referring to FIG. 6, there is shown a data transmission operation flow chart for a conventional facsimile machine at the transmitting end in accordance with the MIL-STD-188-161 B&C standard. At step 302, the facsimile machine at the transmitting end transmits a TOP protocol. As illustrated in FIGS. 3A-3C and 4A-4C, the TOP protocol includes three replicated Command and Start of Message (CMDSOM) frames. Each of these frames provides information to indicate resolution and image data type for the following image data. At step 304, the operation then tests whether the facsimile machine at the transmitting end is pre-set in a non-handshake mode or in a handshake mode.

If the facsimile machine at the transmitting end is pre-set in a handshake mode, the operation leads to step 306 to await a response (HSK protocol) from a facsimile machine at the receiving end. Next, step 308 tests whether the response is received within 15 seconds. If the response is not received within 15 seconds, the operation leads to step 310 to generate an error status because handshake mode requires the response from the facsimile machine at the receiving end. Error handling process are obvious to those skilled in the art and will not be described in detail herein. If step 308 tests that the response is received within 15 seconds, the operation leads to step 312 to further test whether the facsimile machine at the transmitting end is set for compressed data type.

If step 304 tests that the facsimile machine at the transmitting end is pre-set for non-handshake mode, the operation will directly lead to step 312 to test whether the transmitting facsimile machine is set for compressed data type.

If step 312 tests that the facsimile machine at the transmitting end is set for compressed data type, the operation leads to step 314 for further testing whether the facsimile machine at the transmitting end is set for FEC. If the facsimile machine at the transmitting end is set for FEC, step 316 transmits BOT protocol including three frames SOM (start of message) frames. As indicated in FIGS. 3B, FIG. 4B and FIG. 5, each of the three SOM frames has a format of $S_1S_0XS_0S_1$. The X value within a SOM frame defines FEC. Specifically, in FIG. 3B and FIG. 4B, X=255 indicates FEC. At step 318, the facsimile machine at the transmitting end transmits compressed data with FEC.

If step 314 tests that the facsimile machine at the transmitting end is not set for FEC, step 320 transmits the BOT protocol that includes three FEC control frames (SOM frames). As indicated in FIG. 3A and FIG. 4A, a number X=254 in each of the three SOM frames indicates non-FEC. At step 318, the facsimile at the transmitting end transmits compressed data without FEC.

If step 312 tests that the facsimile machine at the transmitting end is set for uncompressed data type, the operation leads to step 324 to transmit a BOT protocol including an $S_0S_0$ frame. Where uncompressed data type is involved, this invention uses the first $S_0S_0$ frame in the signal timing (shown in FIG. 3C) as the BOT protocol. In reality, the prior art only considers the $S_0S_0$ frame as a part of the image data, and prior art facsimile machines do not use the $S_0S_0$ frame in the manner used by this invention.

After the image data have been sent out at step 318, 322 or 326, the data transmission operation of the transmitting end generates an EOM frame and terminates at step 328.

Figure 7:
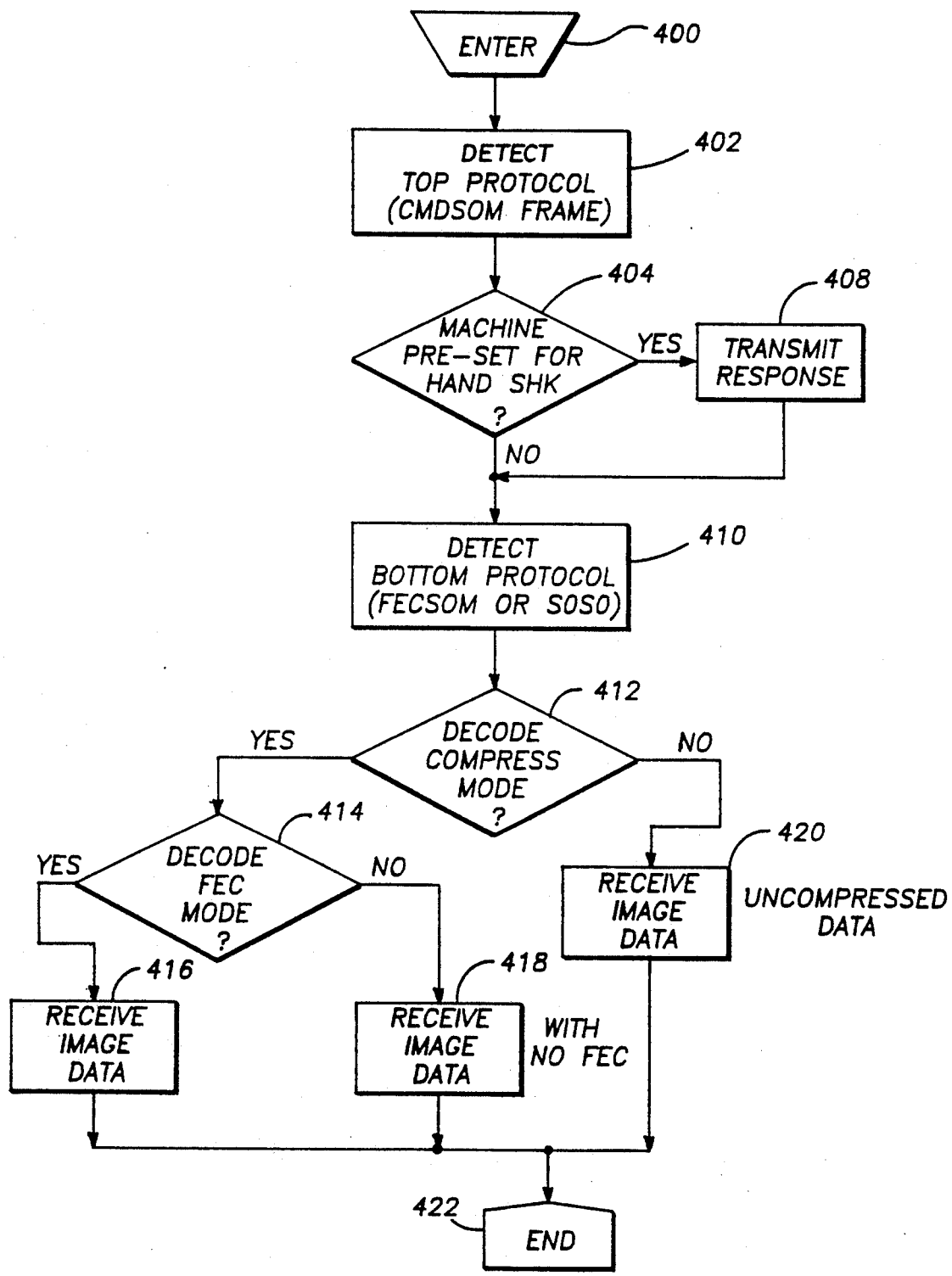
FIG. 7 illustrates operational steps for a conventional facsimile machine at the receiving end, in accordance with the MIL-STD-188-161 B&C standard.

Referring now to FIG. 7, there is shown a data transmission operation flow chart for a conventional facsimile machine at the receiving end, in accordance with the MIL-STD-188-161 B&C standard. At step 402, the facsimile machine at the receiving end detects the TOP protocol. At step 404, the operation then tests whether the facsimile machine at the receiving end is pre-set for a non-handshake mode or for a handshake mode.

If step 404 tests that the facsimile machine at the receiving end is pre-set in a handshake mode, the operation leads to step 408 to transmit the response (HSK protocol) to the facsimile at the transmitting end. The handshake protocol provides three kinds of information: (1) the receiving facsimile machine is ready to receive the image data, (2) the receiving facsimile machine is not ready, or (3) whether the information in CMDSOM frames is compatible with the receiving facsimile machine. After the response has been sent out, the operation detects the BOT protocol at step 412.

If step 404 tests that the facsimile machine at the receiving end is pre-set in a non-handshake mode, the operation directly leads to step 410 to detect BOT protocol.

As described in the data transmission operation for the facsimile at the transmitting end, the BOT protocol has different formats in accordance with image data types. By decoding the BOT protocol generated at the transmitting end, the facsimile machine at the receiving end can confirm the data type indicated by earlier received CMDSOM frames in the TOP protocol.

With further reference to FIG. 7, after step 410 has detected the BOT protocol, step 412 confirms whether the TOP protocol (CMDSOM frames) indicates compressed data type or uncompressed data type. If compressed data type is indicated, step 414 further tests whether the BOT protocol indicates the compressed data with FEC. If the TOP protocol indicates compressed data, and the BOT protocol indicates FEC, the operation leads to step 416 to receive the compressed data with FEC. But if the TOP protocol indicates compressed data, and the BOT indicates non-FEC, the operation leads to step 418 to receive the compressed data without FEC.

If step 412 tests that the image data is uncompressed type, the operation leads to step 420 to receive uncompressed data.

After image data have been received at step 416, 418 or 420, the data transmission operation of the receiving facsimile machine detects the EOM frame and terminates at step 422.

From the data transmission operation illustrated by FIGS. 6 and 7, it should be noted that conventional facsimile machines at the transmitting end and the receiving end have to be pre-set in the same mode to operate properly.

By contrast, facsimile machines in accordance with the present invention include a mechanism to detect the operation mode of a transmitting facsimile machine from the received message, and to automatically set and re-set the receiving facsimile machine in a corresponding mode. The principle used by the present invention for detecting operation mode from the received message of the present invention is best understood by first analyzing the signal timings depicted in FIGS. 3A-3C and 4A-4C.

As illustrated in FIGS. 3A and 3B, in a non-handshake mode for transmitting compressed image data, the BOT protocol (including three SOM frames) occurs between two stuffing frames. The right stuffing frame immediately follows the ending frame (the third CMDSOM frame from left) of TOP protocol. The time period between the start of the left and the end of the right stuffing frames is within a range of 2-3 seconds. As illustrated in FIG. 3C, in a non-handshake mode for transmitting uncompressed image data, a stuffing frame occurs between the ending frame (the third CMDSOM frame from left) of the TOP protocol and the BOT protocol (including a $S_0S_0$ frame). The maximum bit length for a CMDSOM or a SOM frame is less than 150 bits, and the bit length for a $S_0S_0$ frame is 30 bits. Thus, compared with the duration of a stuffing frame, the duration of a CMDSOM frame, or a SOM frame, or a $S_0S_0$ frame is negligible.

At this stage, it should be noted that in FIGS. 3A-3C and 4A-4B there are three identically replicated CMDSOM frames in the TOP protocol, and in FIGS. 3A-3B and 4A-4B there are three identical replicated SOM frames in the BOT protocol. According to the MIL-STD-188-161 B&C standard specifications, detection of any one of the duplicated frames is considered a valid detection of either the TOP or the BOT protocol.

Thus, according to the above analysis of FIG. 3A-3C, in non-handshake mode of operation, the detection of the BOT protocol must appear within 3 seconds after the detection of the TOP protocol.

By contrast, in handshake mode of operation (as illustrated in FIGS. 4A-4C), detection of BOT protocol cannot appear within 4 seconds after the detection of the TOP protocol. This is so because HSK protocol (with a duration $>=4$ seconds) is generated by the receiving end, and occurs between the TOP and the BOT protocols.

By measuring the time between detections of the TOP and the BOT protocols, the present invention can identify the operation mode of the facsimile machine at the transmitting end. Specifically, if the BOT protocol is detected within 3 seconds after the TOP protocol has been detected, the facsimile machine at the transmitting end is in a non-handshake mode. If the BOT protocol is not detected within 3 seconds after the TOP protocol has been detected, the facsimile machine at the transmitting end is in a handshake mode.

Figure 8:
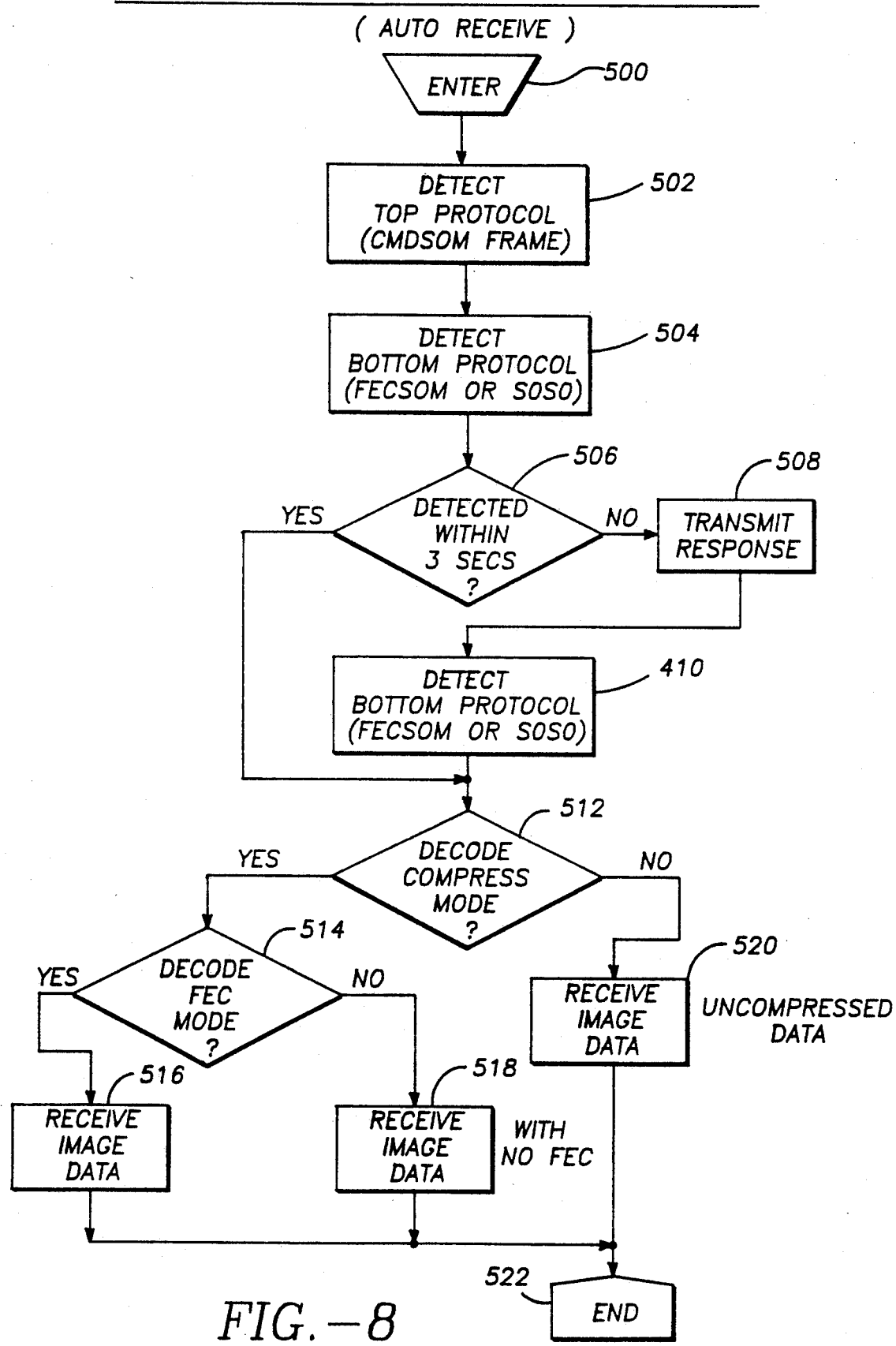
FIG. 8 illustrates operational steps for a facsimile machine at the receiving end, in accordance with this invention.

Referring now to FIG. 8, there is shown a data transmission operation flow chart for a facsimile machine at the receiving end, in accordance with the present invention. At step 502, the facsimile machine at the receiving end detects the TOP protocol and at step 504 tries to detect the BOT protocol. Step 506 tests whether the BOT protocol is detected within 3 seconds after the TOP protocol has been detected.

At step 506, if the BOT protocol is not detected within 3 seconds after the TOP protocol has been detected, the facsimile machine at the receiving end transmits a response (HSK protocol) to the facsimile machine at the transmitting end. As described above, if the BOT protocol is not detected within 3 seconds after the TOP protocol has been detected, the facsimile machine at the transmitting end must be in the handshake mode of operation. After it sends a response, the facsimile machine at the receiving end detects the BOT protocol. This is so because upon receiving the response, the facsimile machine at the transmitting end will transmit a BOT protocol. The operation then leads to step 512 to test data type.

At step 506, if the BOT protocol is detected within 3 seconds after the TOP protocol has been detected, the operation will directly lead to 512 to test image data type without sending out a response (HSK protocol). As described above, if the BOT protocol is detected within 3 seconds after the TOP protocol has been detected, the facsimile machine at the transmitting end must be in a non-handshake mode of operation.

At step 512, the facsimile machine at the receiving end identifies data type by decoding the TOP protocol. If the TOP protocol indicates compressed data type, step 514 further tests whether the BOT protocol indicates the compressed data type with FEC. If the TOP protocol indicates the data are compressed data, and the BOT protocol indicates FEC, the operation leads to step 516 to receive the compressed data with FEC. But, if the TOP protocol indicates the data are compressed data type, and the BOT protocol indicates non-FEC, the operation leads to step 518 to receive the compressed data without FEC.

If step 512 tests that data are uncompressed data type, the operation leads to step 520 to receive the uncompressed data.

After the image data have been received at step 516, 518 or 520, the data transmission operation of the receiving end detects the EOM frame and terminates at step 522.

Figure 9:
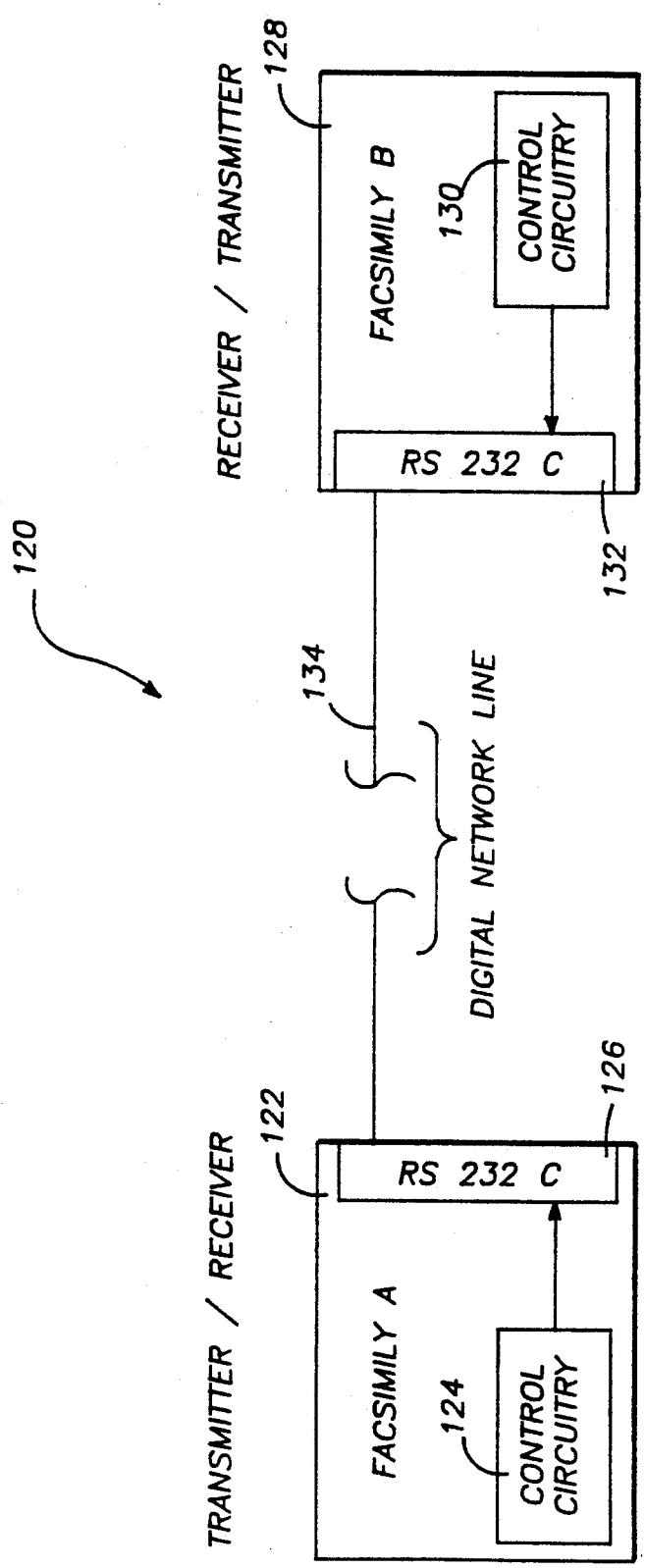
FIG. 9 illustrates a facsimile machine transmission system, in accordance with this invention.

Referring to FIG. 9, there are shown a facsimile machine A (122) and a facsimile machine B (128), in accordance with the present invention. Two facsimile machines are connected to digital network line 134 and communicate with each other through the digital line, in accordance with the MIL-STD-188-161 B&C standard. Each facsimile machine may act either as a transmitter or a receiver.

The facsimile machines A and B include respective control circuitry 124 and 130, and respective serial port 126 and 132, where the serial ports may be standardized RS 232C serial port. The control circuitry at the transmitting end generates the TOP and BOT protocols, and image data. The serial port at the transmitting end delivers the protocols and the image data to the serial port at the receiving end. At the receiving end, the serial port provides the received protocols and image data to the control circuitry at the receiving end. The control circuitry at the receiving end generates the HSK protocol (if necessary) and decodes the received protocol and image data.

In both facsimile machines A and B, the control circuitry can identify the operation mode of the transmitting facsimile machine by detecting the received TOP and BOT protocols. The control circuitry also determines whether to generate the HSK protocol in response to the operation mode of the transmitting facsimile machine.

Figure 10:
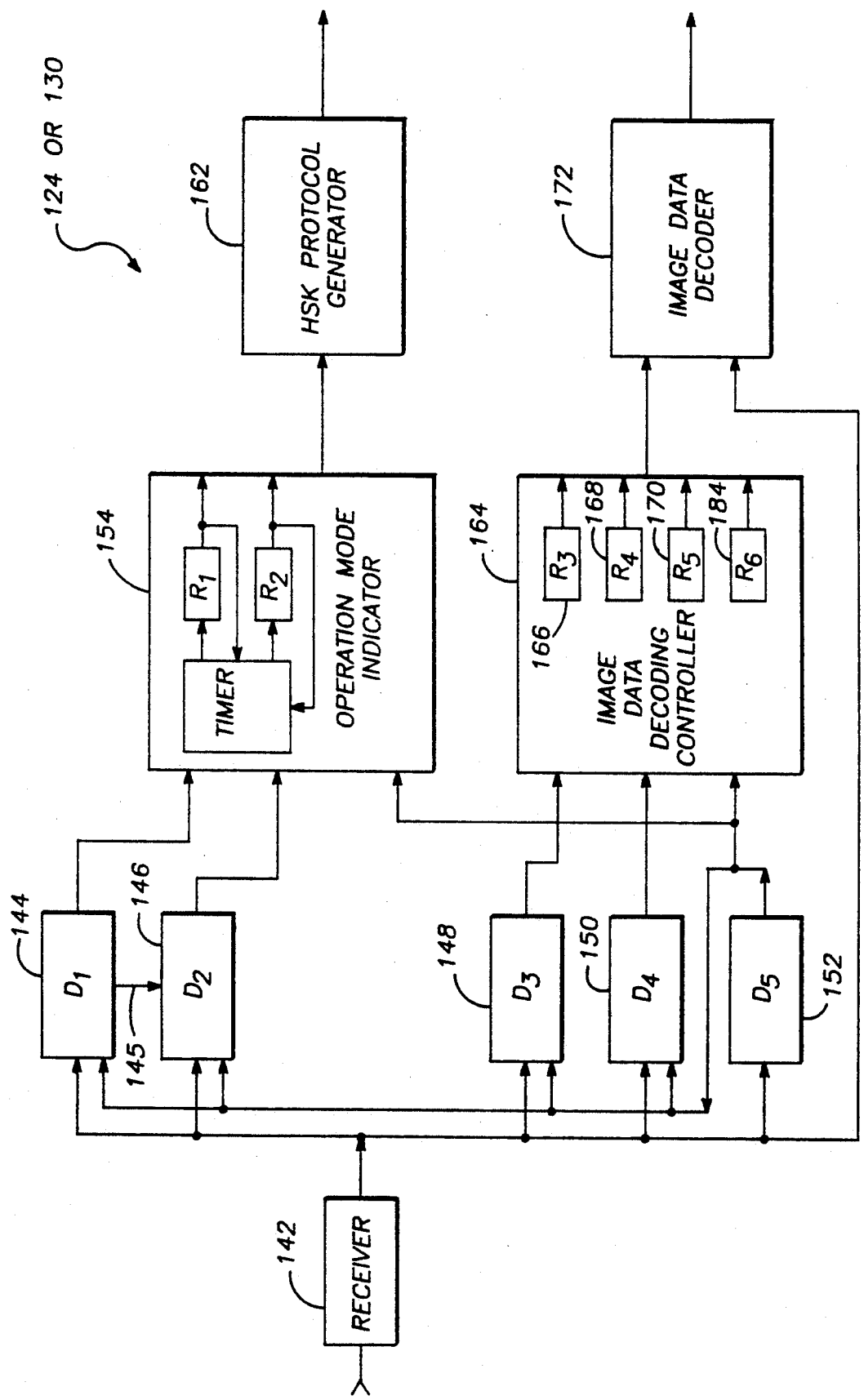
FIG. 10 illustrates a circuit block diagram for automatically setting modes of operations, in accordance with the invention.

Referring to FIG. 10, there are shown details of control circuitry 124 and control circuitry 130 of FIG. 9. The control circuitry includes receiver 142, detectors 144, 146, 148, 150, and 152 (D1, D2, D3, D4 and D5), operation mode indicator 154, HSK protocol generator 162, image data decoding controller 164 and image data decoder 172.

Detectors D1-D4 are preferably re-setable, and each of them can detect a signal having a pre-determined format. However, a following signal with the same pre-determined format will not trigger the detector (D1, D2, D3 or D4) unless they are re-set. After the desired signals have been detected, the output of a detector (D1, D2, D3 or D4) remains in an active state until re-set.

Operation mode indicator 154 further includes timer 156, register 158 (R1) and register 160 (R2). Image data decoding controller further includes register 166 (R3), register 168 (R4), register 170 (R5), and register 184 (R6). The registers R1-R6 are preferably re-setable, where the active state of a re-setable register remains until the register is re-set. The timer 156 is also preferably re-setable.

Operation of the control circuitry shown in FIG. 10 is as follows: receiver 142 receives signals transmitted by a facsimile machine at the transmitting end, and provides the received signals to detectors D1-D5 and image data decoder 172. Detector D1 detects the TOP protocol, detector D2 detects the BOT protocol, detector D3 detects the data type contained in the TOP protocol, detector D4 detects FEC contained in the BOT protocol, and detector D5 detects the EOM frame. The outputs of detectors D1-D2 are coupled to operation mode indicator 154 to control the setting of the operation mode, and the outputs of detectors D3-D4 are coupled to image data decoding controller 164 to control the decoding of image data. The output of detector D5 is coupled to detectors D1-D4, operation mode indicator 154 and image data decoding controller 164 to re-set the detectors D1-D4, the registers R1-R6 and timer 156.

Upon receiving the detected protocols from detectors D1, operation mode indicator 154 uses the detection of TOP protocol to trigger timer 156. If the BOT protocol is detected by D2 within 3 seconds after the TOP protocol has been detected, timer 156 sets register R1 in an active state, indicating a non-handshake mode. But if the BOT protocol is not detected by D2 within 3 seconds after the TOP protocol has been detected, timer 156 sets register R2 in an active state, indicating a handshake mode. The active state of either R1 or R2 disables timer 156 until it is re-set.

Since the information stored in registers R1 and R2 reflects the operation mode of the facsimile at the transmitting end, the outputs of registers R1 and R2 are coupled to HSK protocol generator 162. HSK protocol generator 162 generates HSK protocol according to the information stored in register R1 and R2.

Upon receiving detected data type from detectors D3, image data decoding controller 164 sets register R3 or Register R4. If compressed data type is detected, image data decoding controller 164 sets register 166 (R3) in an active state, indicating compressed data type. If uncompressed data type is detected, the image data decoding controller 164 sets register 168 (R4) in an active state, indicating uncompressed data type.

Upon receiving detected data type from detectors D4, image data decoding controller 164 sets register R5 or Register R6. If FEC is detected, the image data decoding controller 164 sets register 170 (R5) in an active state, indicating FEC. If non-FEC is detected, the image data decoding controller 164 sets register 184 (R6) in an active state, indicating non-FEC.

The outputs of detectors R3-R6 are coupled to image data decoder 172, which decodes the image data for the facsimile machine at the receiving end in response to the information provided by registers R3-R6.

Detector D6 (152) detects EOM frame, and resets detectors D1-D2, R1-R6 and timer 156, initializing the facsimile machine at the receiving end.

Additional details of TOP and BOT protocol detection is gained by referring back to FIGS. 3A-3C, 4A-4C, 5 and 10. As illustrated in FIG. 5, each type of frame has its own unique signal format. Thus, a detector can be specially designed to detect a particular signal format.

For example, as illustrated in FIGS. 3A-3C and 4A-4C, the TOP protocol includes three CMDSOM frames. Detection of any one of the three CMDSOM frames triggers detector 144 (D1) into an active state. The CMDSOM frame trailing the detected CMDSOM frame will not trigger the detector because it has not been re-set.

Corresponding to compressed data type and uncompressed data type in non-handshake mode, signal timings are in two different section compositions. FIGS. 3A-3B illustrate the signal timings for compressed data type, where the BOT protocol includes three SOM frames. FIG. 3C illustrates the signal timing for compressed data type where BOT protocol includes only one $S_0S_0$ frame. As described above, each of the three CMDSOM frames included in the TOP protocol provides information to indicate compressed and uncompressed data type. Thus, based on the information in the TOP protocol detected by detector 144 (D1), detector 146 (D2) can differentiate between signal timings having the two different section compositions. This is why detector 146 (D2) is controlled by detector 144 (D1) through line 145.

Specifically, when detector 144 (D1) indicates a compressed data type, detector 146 (D2) detects SOM frames in the BOT protocol. Detection of any one of the three SOM frames triggers detector 146 (D2) into an active state. The SOM frame trailing to the detected CMDSOM frame will not trigger the detector because it has not been re-set.

When detector 144 (D1) indicates an uncompressed data type, detector 146 (D2) detects the $S_0S_0$ frame in the BOT protocol. The detection of the frame triggers detector 146 (D2) into an active state. The $S_0S_0$ frame trailing to the detected $S_0S_0$ frame will not trigger the detector because it has not been re-set.

In non-handshake mode, detection of the BOT protocol must be within 3 seconds after the detection of TOP protocol.

Corresponding to compressed data type and uncompressed data type in the handshake mode, signal timings are also in two different section compositions. FIGS. 4A-4B illustrate the signal timings for compressed data type, where the BOT protocol includes three SOM frames. FIG. 4C illustrates the signal timing for compressed data type, where the BOT protocol includes only one $S_0S_0$ frame. The detection processes of the TOP and BOT protocols are the same as for non-handshake mode. In handshake mode, however, detection of the BOP protocol must be beyond 4 seconds after detection of TOP protocol, because HSK protocol (having a minimum duration of 4 seconds) occurs between TOP and BOT protocols.

The design of specific structures of detectors D1-D5, operation mode indicator 154, HSK protocol generator 162, image data decoding controller 164 and image data decoder 172 (shown in FIG. 10) are known to those skilled in the art, given the principles of this invention. Thus, the design details will not be described herein.

While one particular embodiment of the invention has been described in detail, it will be understood that the invention may be implemented through alternative embodiments. For example, even though the embodiment has been explained in combination with the MIL-STD-188-161 B&C standard and facsimile machines, the same principles apply to other data communication protocols for equipment other than facsimile machines, if the data communication protocols have similar patterns with the MIL-STD-181-161 B&C standard. Similarly, instead of using two registers (R1 and R2 in FIG. 10) to indicate handshake mode and non-handshake mode respectively, one register could be used to indicate both handshake and non-handshake modes. For example, the active state of the register could indicate handshake mode, and the in-active state could indicate non-handshake mode. Thus, the scope of the invention is not intended to be limited to the embodiment described above, but is to be defined by the appended claims.

What is claimed is:

1. An apparatus being adaptable to a protocol standard for transmitting and receiving data, said standard defining a first operation mode, a second operation mode, a first protocol type, a second protocol type, and a response protocol type, said apparatus comprising:
   means for detecting said first protocol type;
   means for detecting said second protocol type;
   means for setting said apparatus in said first operation mode and said second operation mode in response to detections of said first protocol type and said second protocol type; and
   means for selecting said responsive protocol type in response to said first operation mode and said second operation mode set by said setting means.

2. The apparatus of claim 1, wherein said setting means further comprises:
   means for determining a time interval between detections of said first protocol type and said second protocol type.

3. The apparatus of claim 2, wherein said setting means further comprises:
   means for indicating said first operation mode and said second operation mode in response to said determining means.

4. The apparatus of claim 3, said apparatus further comprises:
   means for detecting data type; and
   means for decoding data according to said data type detected by said data type detecting means.

5. The apparatus of claim 3, wherein:
   said first operation mode is non-handshake mode, and
   said second operation mode is handshake mode.

6. The apparatus of claim 5, wherein:
   said first protocol type is a TOP protocol,
   said second protocol type is a BOT protocol, and
   said response protocol is a HSK protocol.

7. The apparatus of claim 6, wherein:
   said TOP protocol includes information indicating image data type,
   said BOT protocol includes information confirming said data type, and
   said HSK protocol includes information indicating whether a facsimile machine at receiving end is ready and whether the information in said TOP protocol is compatible with said facsimile at the receiving end.

8. The apparatus of claim 6, wherein said standard is MIL-STD-188-161 B&C standard.

9. The apparatus of claim 2, wherein:
   said setting means sets said apparatus in said first operation mode when said second protocol type is detected within a predetermined time interval after said first protocol type has been detected, and
   said setting means sets said apparatus in said second operation mode when said second protocol type is not detected within said predetermined time interval after said first protocol type has been detected.

10. The apparatus of claim 9, wherein:
    said first operation mode is non-handshake mode, and
    said second operation mode is handshake mode.

11. The apparatus of claim 10, wherein:
    said first protocol type is a TOP protocol,
    said second protocol type is a BOT protocol, and
    said response protocol is a HSK protocol.

12. The apparatus of claim 11, wherein:
    said TOP protocol includes information indicating image data type,
    said BOT protocol includes information confirming said data type, and
    said HSK protocol includes information indicating whether a facsimile machine at the receiving end is ready and whether the information in said TOP protocol is compatible with said facsimile at the receiving end.

13. The apparatus of claim 11, wherein said protocol standard is MIL-STD-188-161 B&C standard.

14. A method of operating an apparatus adaptable to a protocol standard for transmitting and receiving image data, said standard defining a first operation mode, a second operation mode, a first protocol type, a second protocol type, and a response protocol type, said method comprising the steps of:
    detecting said first protocol type;
    detecting said second protocol type;
    setting said apparatus in said first operation mode and said second operation mode in response to detections of said first protocol type and said second protocol type; and
    selecting said response protocol type in response to said first operation mode and said second operation mode set by said setting step.

15. The method of claim 14, wherein said setting step further comprises the step of:
    determining a time interval between detection of said first protocol type and said second protocol type.

16. The method of claim 15, wherein said setting step further comprises the step of:
    indicating said first operation mode and said second operation mode in response to said determining means.

17. The method of claim 16, wherein:
    said first operation mode is a non-handshake mode, and
    said second operation mode is a handshake mode.

18. The method of claim 17, wherein:
    said first protocol type is a TOP protocol,
    said second protocol type is a BOT protocol, and
    said responsive protocol is a HSK protocol.

19. The method of claim 18, wherein:
    said TOP protocol includes information indicating image data type,
    said BOT protocol includes information confirming said data type, and
    said HSK protocol includes information indicating whether a facsimile machine at receiving is ready and whether the information in said TOP protocol is compatible with the said facsimile at the receiving end.

20. The method of claim 19, wherein said protocol standard is MIL-STD-188-161 B&C standard.

21. The method of claim 15, wherein said method further comprises the steps of:
    detecting image data type; and
    decoding image data according to said image data type detected by said image data type detecting step.

* * * * *